United States Patent [19]

Tillotson

[11] Patent Number: 4,460,160

[45] Date of Patent: Jul. 17, 1984

[54] CHOKER FAIR-LEAD ASSEMBLY FOR TRACTORS

[76] Inventor: Darrell A. Tillotson, P.O. Box 65, White Salmon, Wash. 98672

[21] Appl. No.: 391,998

[22] Filed: Jun. 25, 1982

[51] Int. Cl.³ .......................... B66D 1/36; B66D 3/08
[52] U.S. Cl. ..................................... 254/386; 254/327
[58] Field of Search ............... 254/386, 326, 327, 335, 254/280

[56] References Cited

U.S. PATENT DOCUMENTS

| | | | |
|---|---|---|---|
| 1,793,545 | 2/1931 | DeRocher | 254/327 X |
| 2,428,085 | 9/1947 | Largen . | |
| 2,665,110 | 1/1954 | Tourneau | 254/327 |
| 2,712,370 | 7/1955 | Westfall . | |
| 2,720,380 | 10/1955 | Dyer . | |
| 2,827,715 | 3/1958 | Wagner . | |
| 2,957,678 | 10/1960 | Jones | 254/323 |
| 3,976,210 | 8/1976 | Allen . | |

Primary Examiner—Stuart S. Levy
Assistant Examiner—Thomas R. Hannon
Attorney, Agent, or Firm—Eugene M. Eckelman

[57] ABSTRACT

A stationary upright frame is arranged to be mounted on the rear of a tractor and has a horizontal axis fair-lead drum over which choker cables from the drive drum of the tractor are reeved. The horizontal axis fair-lead drum is slidably supported in the upright frame for vertical adjustment by fluid operated cylinders whereby the drum can be moved from a low center of gravity position to an elevated position which holds the choker cables up off the ground.

5 Claims, 4 Drawing Figures

CHOKER FAIR-LEAD ASSEMBLY FOR TRACTORS

BACKGROUND OF THE INVENTION

This invention relates to a new and novel choker fair-lead assembly for tractors.

Heavy duty tractors are commonly used for skidding logs between various points. In such operation, choker cables are used having means at the end thereof for attachment to a log and having their other ends attached to the powered winch drum of the tractor. The winch drum is at a relatively low point on the tractor so as to maintain the center of gravity of such tractor at a low point. When the tractor is returning for another load, the choker cables drag along behind, and frequently when the tractor is maneuvered along its various returning paths and for connection to another load, it runs over the dragging choker cables and tears them off. Such of course requires the costly replacement of the choker cables and furthermore may damage portions of the tractor.

SUMMARY OF THE INVENTION

According to the present invention and forming a primary objective thereof, a choker fair-lead assembly is provided which is adapted for use with tractors in an arrangement such that choker cables attached to the powered winch drum can be elevated and thus raised off the ground and out of the way of the tractor when the latter is running empty, the structure also including the objective of allowing the fair-lead assembly to operate in a lowered adjusted position if desired to provide a center of gravity of pull for the tractor at a low point. Since the winch drum can be raised, a log being dragged can be lifted at its forward end to clear obstructions such as stumps.

Another object is to provide a choker fair-lead assembly of the type described that is simple in construction and operation and readily adaptable to existing tractors.

In carrying out the objectives of the invention, the assembly includes a mounting base plate arranged to be secured to a tractor just above the winch drum. This base plate supports an upright frame providing slidable movement for a horizontal axis fair-lead drum over which choker cables from the winch drum extend. The drum is associated with vertically extensible drive means arranged to move and hold the drum at selected vertical positions on the frame. The drive means preferably comprise multiple stage fluid operated cylinders one on each side of the frame for end support of the drum. The structure of the present assembly facilitates ready attachment to present day tractor structures, including existing tractors.

The invention will be better understood and additional objects and advantages will become apparent from the following description taken in connection with the accompanying drawings.

DETAILED DESCRIPTION OF A PREFERRED EMBODIMENT

Figure 1:
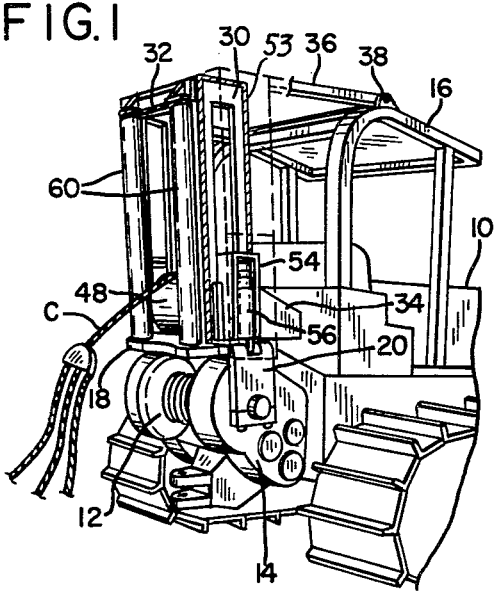
FIG. 1 is a perspective view of the choker fair-lead assembly of the invention as applied to a tractor, the horizontal fair-lead drum which forms a part of the invention being shown in lowered position.

With particular reference to the drawings, the numeral 10 designates a conventional tractor of a suitable type that is capable of use in the woods for skidding logs. Such tractor has a powered winch drum 12 mounted on one end thereof, usually the rear end, by side frames 14 integral with the tractor. Tractors 10 of this type usually are provided with a canopy frame 16.

According to the present invention, a base plate 18 is supported on the winch drum housing and has vertical side plates 20 extending down the sides of the winch drum housing. These sides plates have a bottom segment 20a and such segment and its plate are clamped around a projecting shaft portion 17 of the winch drum. Base plate 18 is of the shape shown in FIG. 4 and has a rear recess 22 accommodating the chokers C in the operation of the fair-lead, as will be more apparent hereinafter. A front recess 24 in the base plate 18 may also be provided to make clearance for the chokers in certain positions of the latter.

A pair of side frames 30 are secured, as by welding, to the base plate 18 and are secured together at the top by a frame member 32. The side frames have reinforced connection to the tractor by gusset plates 34 adjacent the bottom welded between the tractor and such side frames. Top stabilizing arms 36 are secured, as by welding, between the upper portion of the side frames 30 and the tractor canopy frame 16. Arms 36 preferably include rubber grommet connections 38 with the tractor to provide a shockproof-type connection between the upright frame 30 and the canopy frame 16. In a preferred arrangement, the upright frame 30 is tilted rearwardly a slight amount as best seen in FIG. 3.

Each of the side frames 30 has a vertical guide slot 40 slidably receiving slide blocks 42 having apertures 44 providing bearing support for end stub shafts 46 of a horizontal fair-lead drum 48 over which the chokers from the winch drum 12 operate. Slide blocks 42 are movable in slots 40 to provide guided movement of the drum 48 vertically in the side frames 30 and have end plates 50 overlapping inner and outer surfaces of the side frames to provide a positive guided movement. Bearing liners 52 are provided in all sliding surfaces between the members 30 and 42, 50.

Outer guide plates 50 are integral with inverted U-shaped brackets 54 secured to the piston rod of fluid operated cylinders 56 secured at the bottom to side plates 20 and at the top to the top wall of the U-shaped brackets 54. The bottom and top connections for the fluid operated cylinders comprise pivotal connections 58 which allow for slight frame movement if such should occur under a heavy load on the frame. Cylinders 56 preferably comprise multiple stage cylinders to facilitate a relatively long driving stroke but a short retracted length of the assembly.

Figure 2:
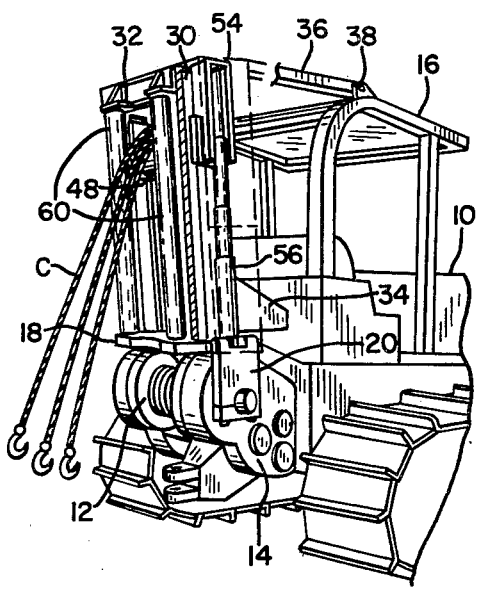
FIG. 2 is a perspective view similar to FIG. 1 but showing the horizontal axis fair-lead drum in an elevated position.
Figure 3:
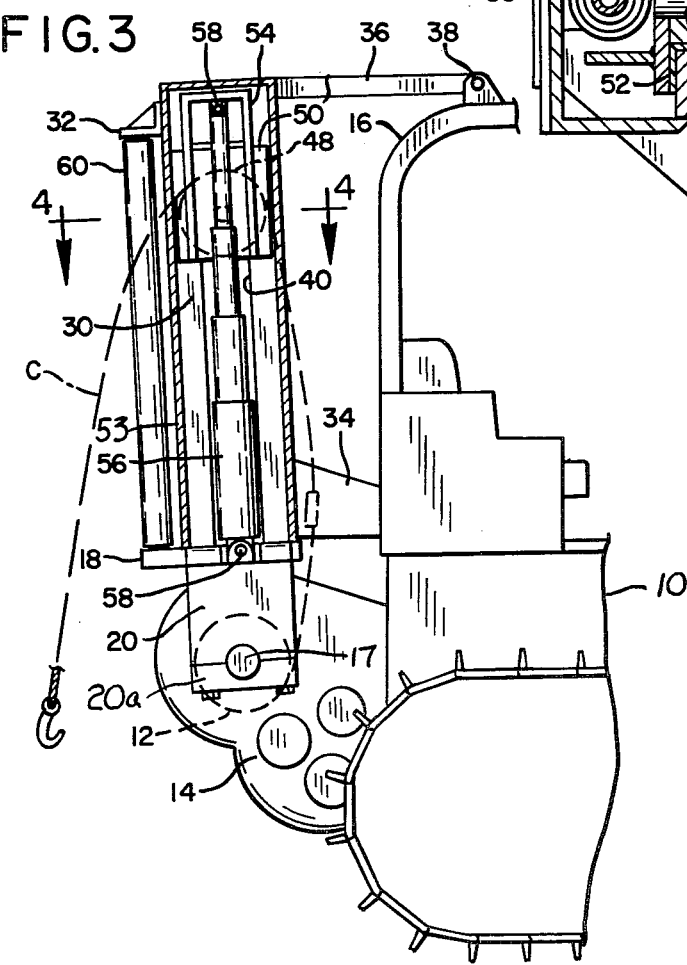
FIG. 3 is a side elevational view of the invention.
Figure 4:
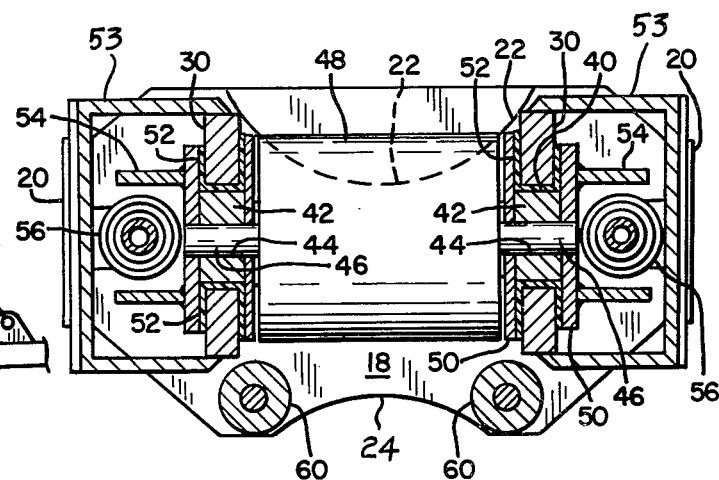
FIG. 4 is an enlarged sectional view taken on the line 4—4 of FIG. 3.

Side boxes 53, broken away in FIGS. 1, 2 and 3 and shown in full lines in FIG. 4, are secured as by welding, to the outer sides of the frame 30 and enclose the cylinders 56 and the brackets 54 for protection. Suitable access plates, not shown, are removably mounted on the lower end of each side box to provide access to the cylinders. Top frame member 32 of the side frames is extended rearwardly a short distance and vertical fair-lead guide bars 60 are supported between such top plate extension and the base plate 18. These vertical guide bars are disposed on opposite sides of the frame and serve to guide the chokers laterally as they operate over the drum 48. Guide bars 60 preferably have a rotatable mount.

In the operation of the present choker fair-lead assembly, the one or more chokers C pass from the winch drum 12 over the top of the horizontal fair-lead drum 48, a clearance for the chokers past the base plate 18 being through the recess 22. When the operator is returning to connect to another load, the chokers can be wound inwardly on the drum 48 and the latter elevated a selected amount whereby the chokers hang free of the ground. When the tractor is pulling a load, the operator can decide the vertical position at which the drum 48 is to be located. Preferably, the drum 48 at this time is lowered so that the center of gravity of pull is at a lowered point, whereby the tractor can pull a load almost as heavy as if the choker cables came directly off the drum 12 to the load. The drum can be raised a little, however, if it is desired to lift the forward end of the log over an obstruction such as a stump.

According to the present invention, the choker fair-lead assembly is provided that can raise the choker cables to an elevated position so that the tractor can maneuver while unloaded without running over the choker cables, and furthermore a low center of gravity can be provided by lowering the drum when pulling heavy loads. If desired, however, the drum 48 can be maintained in an elevated position when the tractor is operating with light loads. Suitable controls can be provided for operation of the cylinders 56 either in the cab or at the winch, or both.

It is to be understood that the foam of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A choker fair-lead assembly for tractors of the type having a winch drum on one end thereof for operating choker cables, said assembly comprising
    a stationary upright frame assembly comprising a a pair of side frames,
    mounting means arranged to mount said side frames on a tractor adjacent to and at opposite ends of the winch drum,
    a vertical slot in each of said side frames,
    a horizontal axis fair-lead drum having opposite ends and arranged for engagement by choker cables from the winch drum,
    guide means on the ends of said fair-lead drum slidably engaged in said slots for providing vertical slidable adjustment of said fair-lead drum on said side frames to raise and lower the choker cables,
    and vertically operating drive means operably connected to said fair-lead drum and arranged for support on the tractor,
    said drive means being extendable and retractable to move and hold said fair-lead drum at selected vertical positions on said side frames.

2. The choker fair-lead assembly of claim 1 wherein said mounting means comprises a base plate integral with said side frames, and means arranged to secure said plate to a tractor.

3. The choker fair-lead assembly of claim 1 wherein said mounting means comprises a base plate integral with said side frames, and means arranged to secure said base plate to a tractor, said base plate having front and rear edges, the rear edge of said plate being recessed inwardly to provide a free cable operating path from the winch drum.

4. The choker fair-lead assembly of claim 1 wherein said mounting means comprises a base plate integral with said side frames, means arranged to secure said base plate to a tractor, and means on said upright frame providing reinforcing connection to a tractor at one or more points above said base plate.

5. A choker fair-lead assembly for tractors of the type having a winch drum on one end thereof for operating choker cables, said assembly comprising
    a stationary upright frame assembly comprising a pair of side frames,
    a base plate,
    means arranged to secure said base plate to a tractor adjacent the winch drum,
    mounting means arranged to mount said side frames on said base plate at opposite ends of the winch drum,
    a horizontal axis fair-lead drum having opposite ends and arranged for engagement by choker cables from the winch drum,
    guide means on the ends of said fair-lead drum slidably engaged with said side frames for providing vertical slidable adjustment of said fair-lead drum on said frames to raise and lower the choker cables,
    and vertically operating drive means in each of said side frames supported on said base plate and operably connected to said guide means at the respective ends of said fair-lead drum,
    said drive means being extendable and retractable to move and hold said fair-lead drum at selected vertical positions on said side frames.

* * * * *